United States Patent [19]
Byrd et al.

[11] Patent Number: 4,496,184
[45] Date of Patent: Jan. 29, 1985

[54] TRUCK CAP

[76] Inventors: David A. Byrd, R.R. 1, Box 111; Max R. Byrd, R.R. 1, Box 110A, both of Craigville, Ind. 46731

[21] Appl. No.: 474,871

[22] Filed: Mar. 14, 1983

[51] Int. Cl.³ .............................................. B60P 7/02
[52] U.S. Cl. ..................................... 296/100; 135/88; 296/156; 296/1 S
[58] Field of Search ...................... 296/156, 100, 102; 135/88

[56] References Cited

U.S. PATENT DOCUMENTS 3,578,378  5/1971  Anderson ............................ 296/100
3,773,379  11/1973  Loiseau ............................... 296/100
4,036,521  7/1977  Clenet ................................. 296/100

Primary Examiner—Robert R. Song
Attorney, Agent, or Firm—David A. Lundy

[57] ABSTRACT

A portable truck cap comprising a plurality of frame members, which are detachably connected to each other to form a frame, the frame has a top portion and a base portion, the top portion is resilient, the base portion is detachably connectable to a truck. A flexible cover is disposed over the frame, and detachably connected to said base portion of the frame. The cover is tensioned by the top portion of the frame to maintain the cover in a predetermined configuration.

30 Claims, 12 Drawing Figures

TRUCK CAP

BACKGROUND OF THE INVENTION

The present invention pertains to truck caps and more particularly to a portable truck cap which can be stored in a relatively small space and minimizes wind resistance.

Truck caps have been used for some time over the cargo boxes of pickups and similar trucks to decrease wind resistance and provide a covered storage space. These truck caps have consisted of two types: solid and flexible.

Solid truck caps consist of a rigid metal, wood or plastic enclosure over the cargo box of the truck. These truck caps eliminate wind resistance of the open cargo box, however, they can add significant wind resistance of their own. Solid truck caps are heavy, difficult to attach and detach, and if detached, take up a significant amount of off vehicle storage space. Because of these reasons, these truck caps are generally left on the vehicle as a permanent or semi-permanent part of the truck. Some solid caps also require that holes be drilled in the truck to permit attachment of the cap.

Flexible truck caps are light and easy to store but have frames requiring holes to be drilled in the truck. Most of them also attach a flexible cover to a frame by means of snaps or similar connectors which must be precisely aligned. This presents a problem when the material used for the cap is vinyl or similar moderately priced flexible materials which expand or contract with changes in temperature. Flexible caps also have a tendency to wrinkle or flap in the wind at high speeds. Both of the latter may result in a shorter than desired life of the truck cap.

It is therefore highly desirable to provide an improved truck cap.

It is also highly desirable to provide an improved truck cap that eliminates wind resistance of the open cargo box, and in addition improves the aerodynamics of the truck in general.

It is further highly desirable to provide an improved truck cap that maintains a smooth streamlined shape during use despite wind resistance.

It is likewise highly desirable to provide a portable truck cap that is easy to attach and detach at any temperature.

It is yet also highly desirable to provide an improved portable truck cap that is easy to store when detached either off the vehicle in a relatively small space or on the vehicle within a portion of the cargo box.

It is yet further highly desirable to provide an improved truck cap that may be attached without drilling holes in the truck.

It would finally be highly desirable to provide an improved truck cap which meets all the above desired features.

SUMMARY OF THE INVENTION

It is an object of the invention to provide an improved truck cap that is not heavy.

It is another object of the invention to provide an improved truck cap that eliminates wind resistance of the open cargo box and, in addition, can improve the aerodynamics of the truck in general.

It is yet another object of the invention to provide an improved truck cap that maintains a smooth streamlined shape during use despite wind resistance.

It is still a further object of the invention to provide a portable truck cap that is easy to attach and detach at any temperature.

It is yet also another object of the invention to provide an improved portable truck cap that is easy to store when detached either off the vehicle in a relatively small space or on the vehicle within a portion of the cargo box.

It is still another object of the invention to provide an improved truck cap that may be attached without drilling holes in the truck.

In the broader aspects of the invention there is provided a portable truck cap comprising a plurality of frame members which are detachably connected to each other to form a frame. The frame has a top portion and a base portion. The frame is detachably connectable to a truck. A flexible cover is disposed over the frame and detachably connected to the base portion of the frame. The cover is tensioned by the top portion of the frame to maintain the cover in a predetermined configuration.

BRIEF DESCRIPTION OF THE DRAWINGS

The above mentioned and other features and objects of this invention and the manner of attaining them will become more apparent and the invention itself will be better understood by reference to the following description of an embodiment of the invention taken in conjunction with the accompanying drawings wherein.

DESCRIPTION OF A SPECIFIC EMBODIMENT

Figure 1:
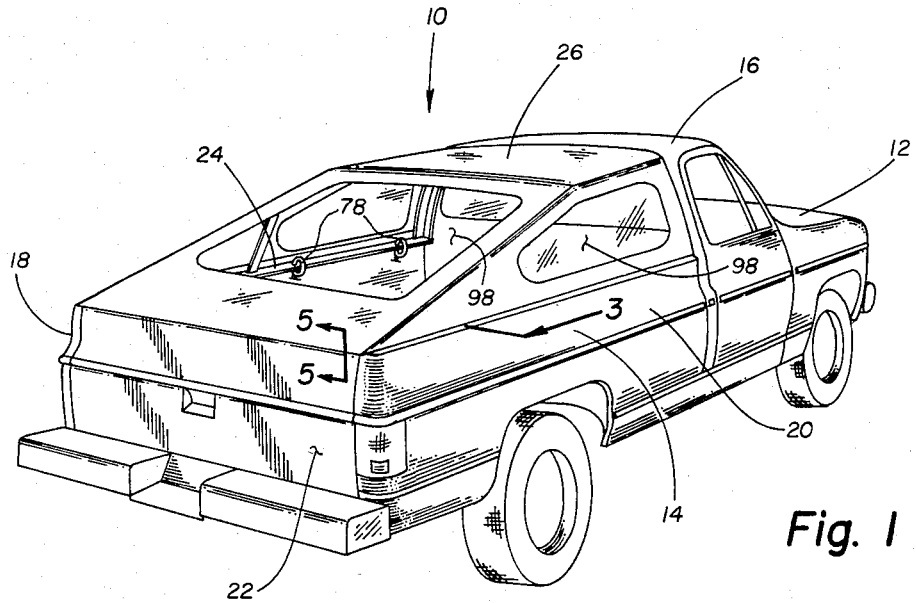
FIG. 1 is a perspective view of the improved truck cap of the invention installed upon a pickup truck.
Figure 1A:
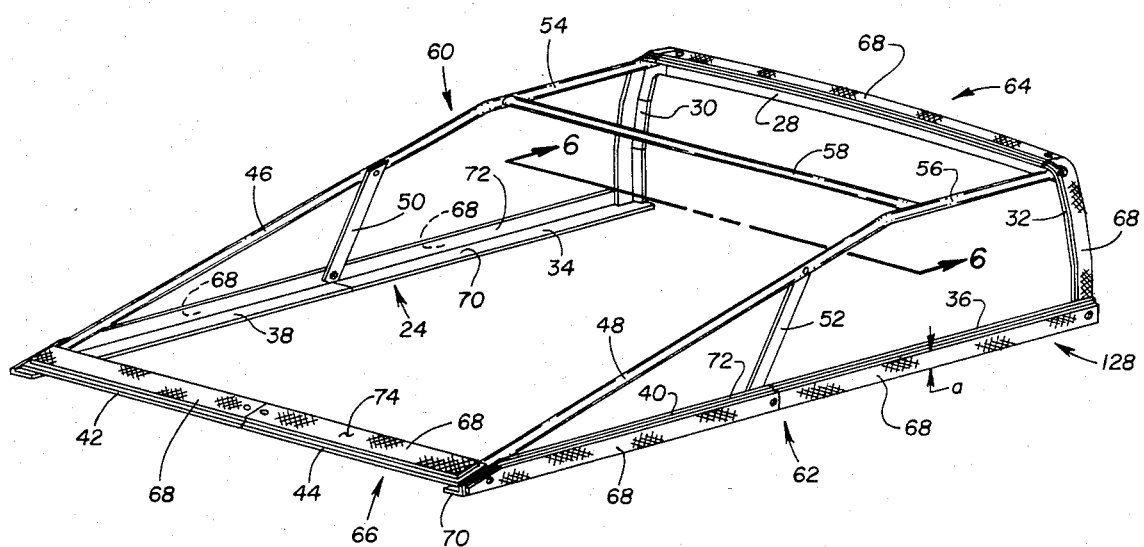
FIG. 1A is a perspective view of the frame of the truck cap shown in FIG. 1.

The truck cap 10 of the invention is designed to be used with a truck 12 having a cargo box 14 and a cab 16. The cargo box 14 has a left side 18 a right side 20 and a tailgate 22. The truck cap 10 comprises a frame 24 which can be attached to the cargo box 14 of the pickup truck 12, and a cover 26 attached to the frame 24.

The frame 24 is composed of frame members 28, 30, 32, 34, 36, 38, 40, 42, 44, 46, 48, 50, 52, 54, 56, 58. The frame has a top portion 60 composed of frame members 46, 48, 50, 52, 54, 56 and 58 and a base portion 62 composed of frame members 28, 30, 32, 34, 36, 38, 40, 42, 44. The base portion of the frame has a front base portion 64 composed of frame members 28, 30, and 32, a main base portion 128 composed of frame members 34, 36 38 and 40 and a rear base portion 66 composed of frame members 42 and 44.

The top portion 60 of the frame 24 is resilient to maintain tension in the cover 26 and to help absorb stresses of wind resistance and of objects striking the cover 26. This resilience is a result of stressing of the flexible top portion 60 during assembly of the frame 24. Frame members 50 and 52 are connected to the inside of the base portion 62 and the inside of the top portion 60 of the frame 24. Since the top portion 60 is narrower than the base portion 62, frame members 46 and 48 must be flexed outward when frame members 50 and 52 respectively are connected. This results in the top portion 60 resiliently opposing a force, such as wind resistance or a thrown object, directed inward toward the top portion 60.

Figure 5:
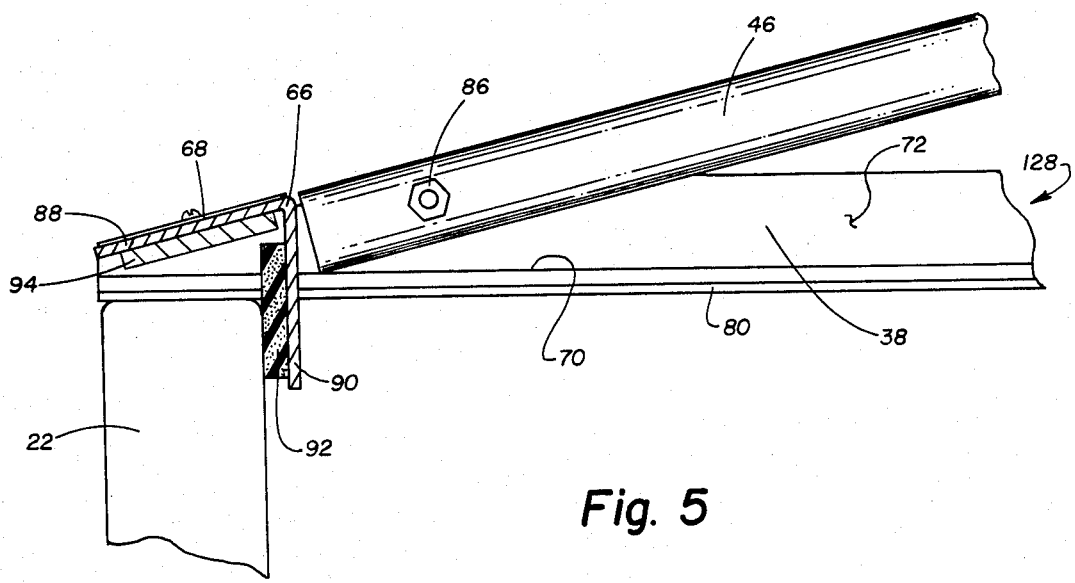
FIG. 5 is a fragmentary and cross-sectional view of the rear of the frame of the truck cap shown in FIG. 1 taken substantially along the section line 5—5 of FIG. 1.

The rear base portion 66 of frame 24 is composed of frame members 42 and 44 aligned and joined together in end to end relation by conventional means. FIG. 5 illustrates a tapped and threaded plate and bolt 94 used to join frame members 42 and 44 together. The rear base postion 66 has a first section 88 positioned over the tailgate 22 and a second section 90 which opposes the front of the tailgate 22. The frame members 42 and 44 are joined together to define obtuse angles with the downwardly facing side of the first section 88 and the rearwardly facing side of the second section 90. These angularities prevent any sag in the rear base portion 66 when the frame 24 is attached to the truck 12 and help keep the cover 26 in tension, smooth and unwrinkled.

Figure 6:
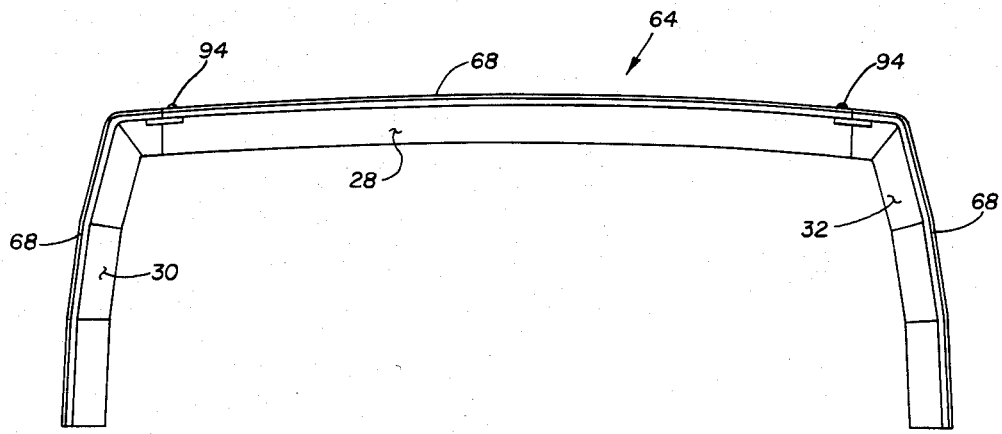
FIG. 6 is a fragmentary view of the front of the frame of the truck cap shown taken substantially along section line 6—6 of FIG. 1A.

The front base portion 64 and the main base portion 128 of the frame 24 are rigid. The front base portion 64, as illustrated in FIG. 6 follows the contours of the truck cab. In a specific embodiment, angle stock is used and frame members 28, 30 and 32 are formed from several pieces cut at an angle to provide a contour like that of the cab and welded together.

The frame members 28 through 58 are detachably connectable together as illustrated. Telescoping joints or unions, bolts and nuts or other conventional fasteners may be used. Tapped and threaded plates and bolts 94 are shown in FIG. 5 and FIG. 6.

The frame members 28 through 58 and the cover 26 are juxtaposable when detached from the truck 12 within a space having its longest dimension less than the interior width of the cargo box 14 and its other two dimensions less than the interior height of the cargo box 14. This permits easy storage of the invention 10 within the cargo box or within a small space off the truck 12 within a bag or other protective container.

Angle stock having an inside flange 70 and an outside flange 72 is used for frame members 34, 36, 38 and 40 which are disposed such that the angle c (shown in FIG. 3) between the inside arm 70 and the outside arm 72 opens towards the inside of the frame 24. The angle c on frame members 34, 36, 38 and 40 is determined by the contour of the cab 16 of the truck 12. On many current trucks this angle will be about 80°.

Figure 2:
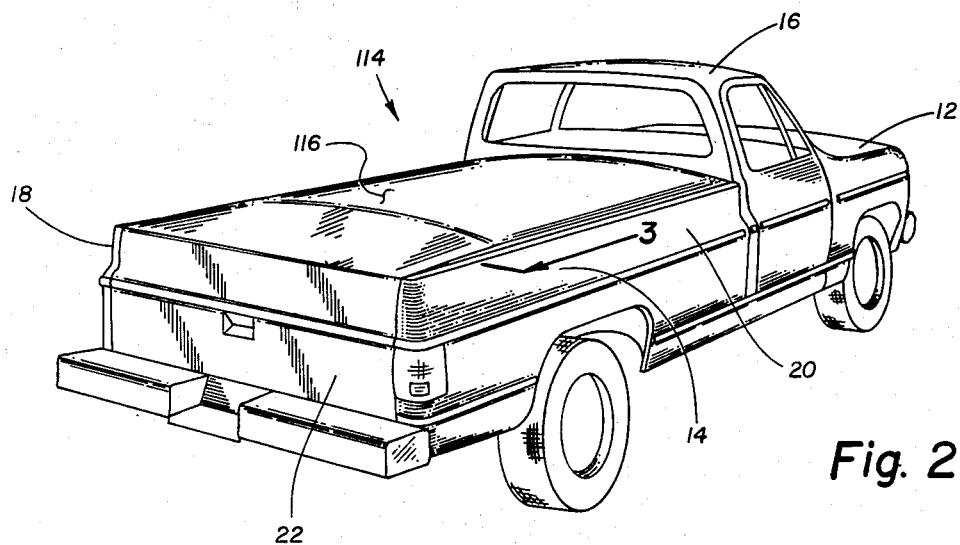
FIG. 2 is a perspective view of a modified truck cap of the invention installed upon a pickup truck.
Figure 7:
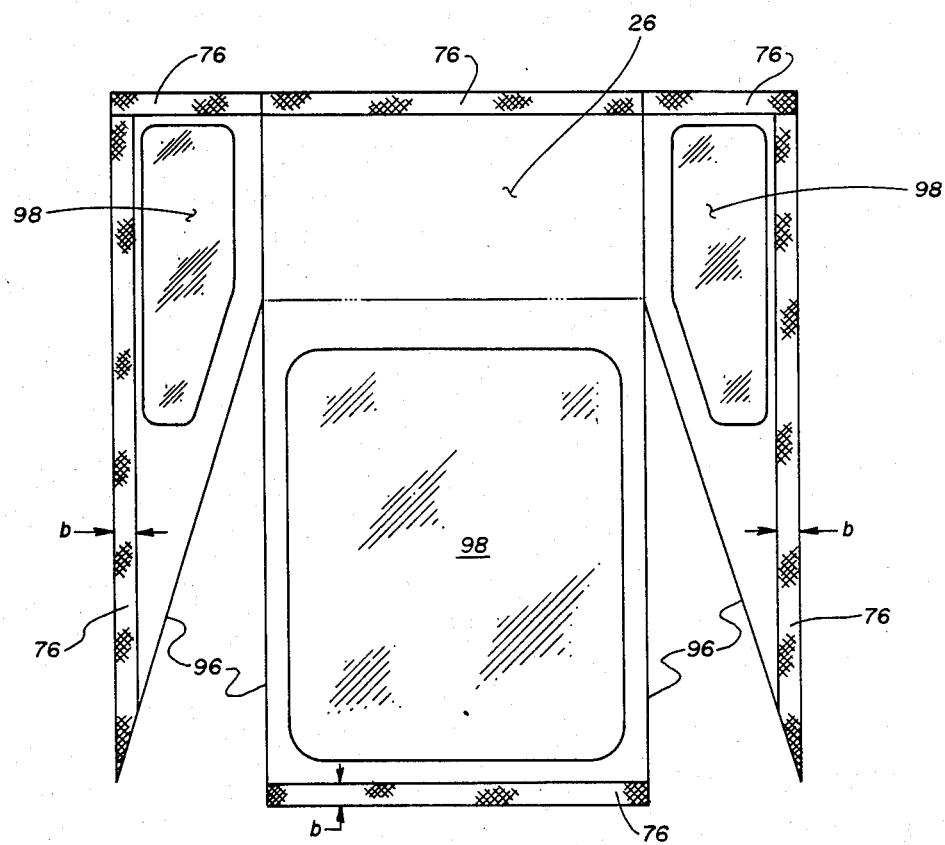
FIG. 7 is a plan view of the cover of the truck cap shown in FIG. 1 with open seams for clarity.

Continuous connectors are attached to the outside arms 72 of frame members 28, 30, 32, 34, 36, 38, 40 and to the upper surface 74 of the rear base portion 66. The term "continuous connector" is used herein for any generally planar connector which is composed of two members which adhere together when overlapped in any orientation such as: Velcro TM materials, adhesive tapes, oppositely polarized magnets, magnets and steel plates. A first member of the continuous connector 68 is attached to the base portion 62 of the frame 24 and adheres to the second member of the continuous connector 76 which is attached to the cover 26 as illustrated in FIGS. 2 and 7. This detachably connects the cover 26 to the frame 24 in air and water tight relationship.

Figure 3:
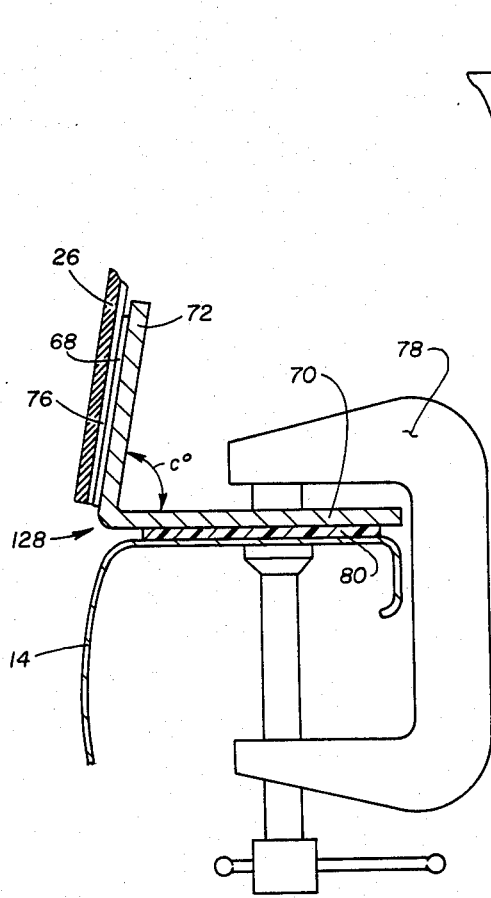
FIG. 3 is a fragmentary cross-sectional view of the frame of the truck cap shown attached to the side rail of a conventional pickup truck taken substantially along the section line 3—3 of FIG. 1 and FIG. 2.
Figure 4:
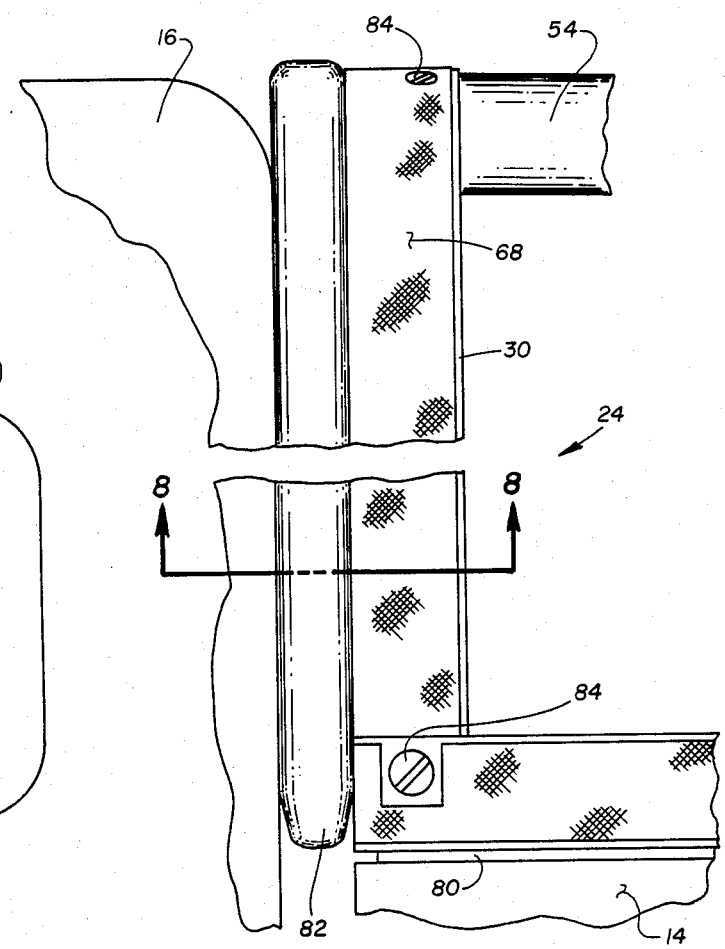
FIG. 4 is a fragmentary side view of the left front end of the truck cap shown in FIG. 1 attached to a conventional pickup truck as shown in FIG. 3, with the cover removed.

The frame 24 may be attached to the truck 12 by any conventional clamps or other means not requiring drilling or other modification of the truck 12. FIG. 3 illustrates in cross-section c-clamps 78 used to attach the main base portion 128 of the frame 24. The connection of the frame members 28–58 together and to the truck 12 also allows by conventional means such as use of slots for bolts rather than holes, for minor changes in alignment of the frame 24 and the truck 12 to compensate for production differences in dimensions of trucks 12 of a particular brand and model and to adjust the tension on the cover 26.

A side seal 80 between the main base portion 128 and the cargo box 14 provides for an air and water tight relationship between the main base portion 128 and the cargo box 14.

A front seal 82 between the cab 16 and the frame 24 provides an air and water tight relationship between the cab 16 and the truck cap 10 of the invention when the cover 26 is installed.

A rear seal 92 attached to the rear base portion 66, is made of compressible resilient material. The rear seal 92 is disposed on the second section 90 of the rear base portion 66 adjacent the tailgate 22. The tailgate remains useable despite the placement of the frame 24 on the truck 12. Closing the tailgate 22 results in compression of the rear seal 92 insuring an air and water tight seal between the frame 24 and the tailgate 22.

In FIG. 7, the cover 26 is illustrated from the underside. The second member of the continuous connector 76 is attached to all of the edges of the cover 26. Seams 96 are illustrated un-sewn for the sake of clarity. These seams 96 are sewn as shown in FIG. 1.

It is desirable to make the cover 26 out of a material which is both moderate in price and waterproof, such as vinyl. The difficulty with such material is that it shrinks and expands with changes in temperature. This may be compensated for by having the width "b" of the second member of the continuous connector 76 attached to the cover 26, greater than the width "a" of the first member of the continuous connector 68 attached to the frame 24, by an amount equal to the change in size of the cover 26 with changes in temperature. See FIGS. 3 and 7. In a specific embodiment of this invention, it was found that a second member of continuous connector 76 having a width twice the width of the first member of the continuous connector 68 was adequate to provide for shrinkage and expansion of a cover 26 made of vinyl. Windows 98 may be provided in the cover 26 to provide light and to allow vision through the cover 26 as desired.

Figure 8:
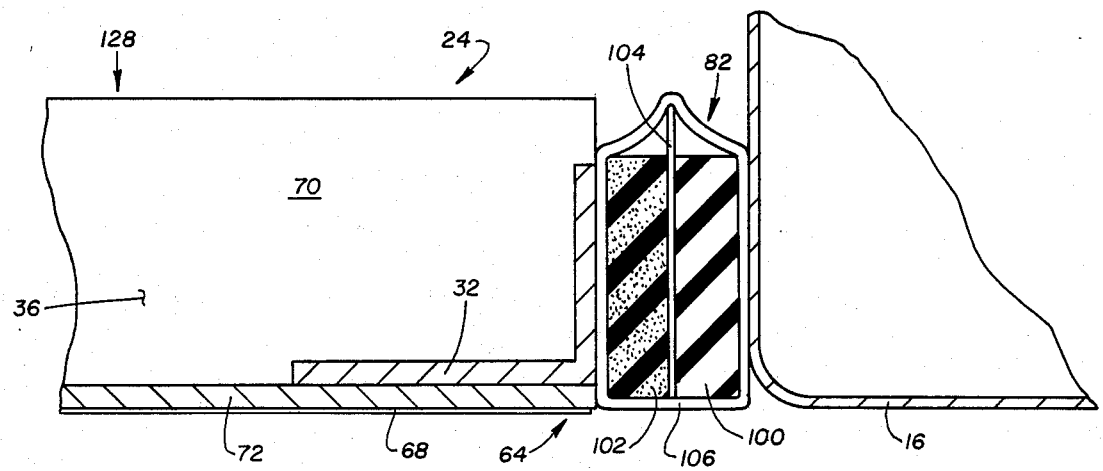
FIG. 8 is a fragmentary cross-sectional view of the right side of the front of the truck cap shown taken substantially along the section line 8—8 of FIG. 4 showing one method of connection between the truck cap and truck cab.

The front seal 82 is shown in cross-section in FIG. 8. The front seal 82 has three layers 100, 102 and 104. The first layer 100 is made of magnetic material which connects the seal to the cab 16. The second layer is of a resiliently compressible material such as synthetic foam rubber. This second layer must be compressed for insertion of the front seal 82 between the cab 16 and the frame 24. A third layer 104 is bound between the first layer 100 and the second layer 102. The third layer is made of a nondeformable material such as ABS plastic or other similar material to restrict relative motion between the first layer 100 and the second layer 102. This insures that the air and water tight relationship between the cab 16 and the frame 24 is maintained despite relative movement between the cab 16 and the cargo box 14. A protective cover 106 is disposed over the three layers 100, 102 and 104 of the front seal 82 to prevent damage due to abrasion.

Figure 8A:
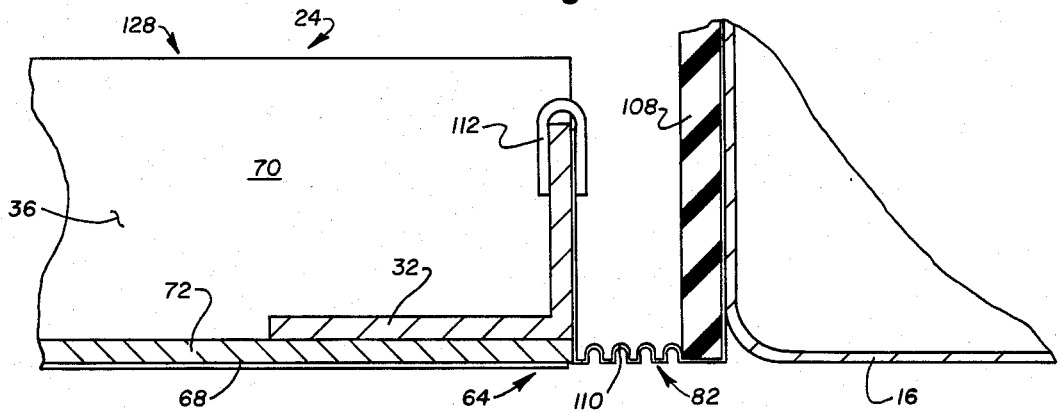
FIG. 8A is a fragmentary cross-sectional view of the truck cap shown taken substantially along the section line 8—8 of FIG. 4 showing another method of connection between the truck cap and truck cab.

An illustration of another front seal 82 of the invention appears in FIG. 8A. As elsewhere herein, like reference numerals will be used to refer to like parts. The front seal 82 has a cab portion 108 magnetically connectable to the cab 16, a middle portion 110 that is made of a flexible accordion material and a resilient retainer 112 that is positioned to detachably grip the frame 24 along the frame member 28. The front seal 82 is retained on the cab 16 by the magnetic cab portion 108 and on the frame 24 by the resilient retainer 112. Relative motion of the cab 16 and frame 24 is compensated for by the accordion material of the middle portion 110.

A modified truck cap 114 of the invention is illustrated in FIG. 2. As elsewhere herein, like reference numerals will be used to refer to like parts. A truck 12 is illustrated having a cab 16 and a cargo box 14. The cargo box has a left side 18 and a right side 20 and a tailgate 22. A cover 116 is shown over the cargo box 14.

The frame 114 is composed of frame members 34, 36, 38, 40, 42 and 44 and a plurality of stays 120. The frame has a rear base portion 66 composed of frame members 42 and 44 a main base portion 128 composed of frame members 34, 36, 38 and 40.

The stays 120 are each composed of stay members 122 and 124. The stays 120 are spaced equidistantly along the frame 118 starting at the cab 16 and are angular to insure deflection of rain off the cover 116.

The rear base portion 66 of frame 118 is composed of frame members 42 and 44, which are aligned and joined in end-to-end relation. The rear base portion 66 has a first section 88 positioned over the tailgate 22 and a second section 90 which opposes the front of the tailgate 22. The frame members 42 and 44 are joined together to define obtuse angles with the downwardly facing side of the first section 88 and the rearwardly facing side of the second section 90. These angularities prevent any sag in the rear base portion 66 when the frame 24 is attached to the truck 12 and help keep the cover 116 in tension, smooth and unwrinkled.

Frame members 34, 36, 38 and 40 are rigid.

The frame members 34 through 44 and the plurality of stays 120 are detachably connectable together as illustrated. Telescoping joints or unions, bolts and nuts or other conventional fasteners may be used.

The frame members 34 through 44 and the stay members 122 and 124 and the cover 116 are juxtaposable when detached from the truck 12 within a space having its longest dimension less than the interior width of the cargo box 14 and its other two dimensions less than the interior height of the cargo box 14. This permits easy storage of the invention 114 within the cargo box 14 or within a small space off the truck 12 within a bag or other protective container.

Angle stock having an inside flange 70 and an outside flange 72 is used for frame members 34, 36, 38 and 40.

Figure 2A:
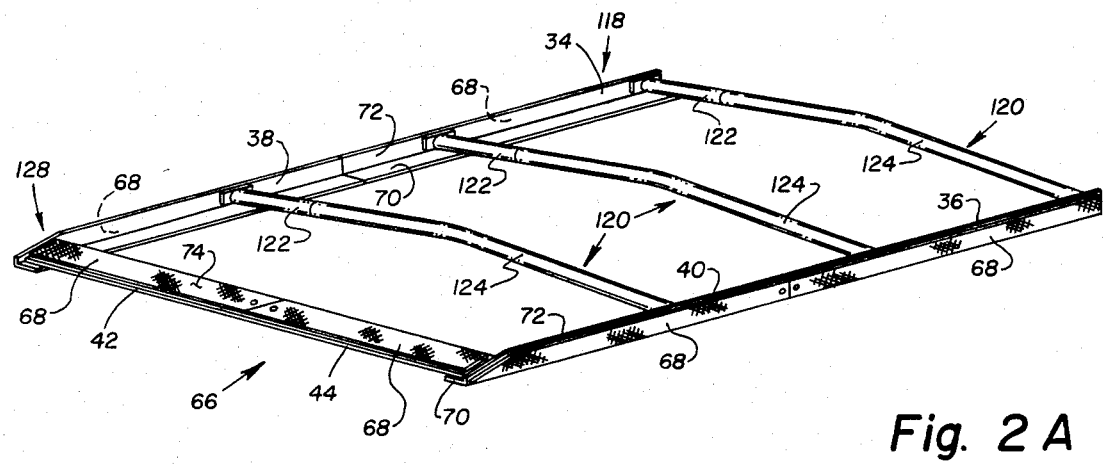
FIG. 2A is a perspective view of the frame of the truck cap shown in FIG. 2.
Figure 7A:
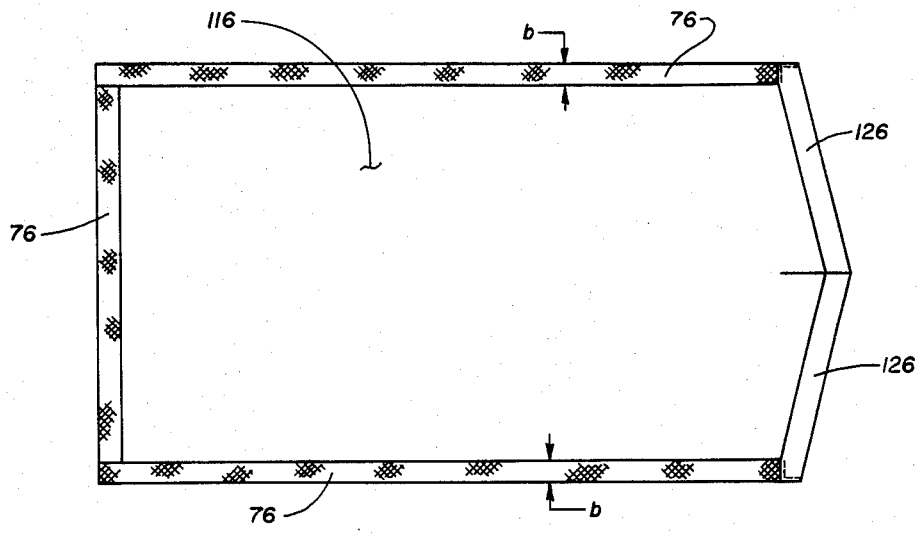
FIG. 7A is a plan view of the cover of the truck cap shown in FIG. 2.

Continuous connectors are attached to the outside flange 72 of frame members 34, 36, 38 and 40 and to the upper surface 74 of the rear base portion 66. The term "continuous connector" is used herein for any generally planar connector which is composed of two members which adhere together when overlapped in any orientation, such as: Velcro materials, adhesive tapes, oppositely polarized magnets, magnets and steel plates. A first member of the continous connector 68 is attached to the frame 118 and a second member of the continous connector 76 is attached to the cover 116 as illustrated in FIGS. 2A and 7A. This detachably connects the cover 26 to the frame 24 in air and water tight relationship.

The frame 118 may be attached to the truck 12 by any conventional clamps or other means not requiring drilling or other modification of the truck 12. FIG. 3 illustrates in cross-section c-clamps 78 used to attach the main base portion 128 of the frame 118 to the cargo box 14 of the truck 12. The connection of the frame members 34-44 together and to the truck 12 also allows by conventional means, such as use of slots for bolts rather than holes, for minor changes in alignment of the frame 24 and the truck 12 to compensate for production differences of trucks 12 of a particular brand and model and to adjust the tension on the cover 116.

A side seal 80 between the main base portion 128 and the cargo box 14 provides an air and water tight relationship between the frame 118 and the cargo box 14.

A rear seal 92 attached to the rear base portion 66, is made of compressible resilient material. The rear seal 92 is disposed on the second section 90 of the rear base portion 66 adjacent the tailgate 22. The tailgate remains useable despite the placement of the frame 118 on the truck 12. Closing the tailgate 22 results in compression of the rear seal 92 insuring an air and water tight seal between the frame 118 and the tailgate 22.

In FIG. 7A, the cover 116 is illustrated from the underside. The second member of the continuous connector 76 is attached to all but one of the edges of the cover 116. On the remaining side of the cover 116 there is a flap 126 which is insertable over the stay 120 nearest the cab 16. The flap 126 along with the continuous connector 68 and 76 retain the cover 116 on the frame 118.

The invention provides an improved portable truck cap that is not heavy, that can improve the aerodynamics of the truck in general, that maintains a smooth streamlined shape during use despite wind resistance, that eliminates wind resistance of the open cargo box, that is easy to attach and detach at any temperature, and that is easy to store when detached either off the vehicle in a relatively small space or on the vehicle within a portion of the cargo box.

While a specific embodiment of the invention has been shown and described herein for purposes of illustration, it is desired that the protection afforded by any patent which may issue upon this application not be limited strictly to the disclosed embodiment; but that it extend to all structures and arrangements which contain the essence of the invention and which fall fairly within the scope of the claims which are appended hereto:

What is claimed is:

1. A truck cap comprising:
   a plurality of frame members, said frame members being repeatedly detachably connectable to each other to form a frame, said frame having a top portion and a base portion, said top portion being resilient, said base portion being relatively rigid, and a flexible cover disposable over said frame, said cover being detachably connectable to said base portion of said frame, said cover being tensioned by said top portion of said frame to maintain said cover in a predetermined configuration.

2. The truck cap of claim 1 wherein: said frame is detachably sealable to said truck in generally air and water tight relationship, and said cover is detachably sealable to said frame in generally air and water tight relationship.

3. The truck cap of claim 1 wherein said predetermined configuration is streamlined to reduce wind resistance.

4. The truck cap of claim 1 further comprising:
   a continuous connector having a first member and a second member, said first member being attached to said base portion of said frame, said second member being attached to said cover, said first member and said second member adhering detachably together, said second member being larger than said first member by an amount and in a direction proportional to the changes in size of said cover with changes in ambient temperature.

5. A truck cap for use with a truck having a cab and a cargo box, said truck cap comprising:
   a plurality of frame members, said frame members being repeatedly detachably connectable to each other to form a frame, said frame having a top portion and a base portion, said top portion being resilient, said base portion being relatively rigid and detachably connectable to said cargo box, and a flexible cover disposable over said frame, said cover being detachably connectable to said base portion of said frame, said cover being tensioned by said top portion of said frame, to maintain said cover in a predetermined configuration.

6. The truck cap of claim 5 wherein: said frame is detachably sealable to said truck in generally air and water tight relationship and said cover is detachably sealable to said frame in generally air and water tight relationship.

7. The truck cap of claim 5 wherein said predetermined configuration is streamlined and roughly wedge shaped.

8. The truck cap of claim 5 further comprising:
   a continuous connector having a first member and a second member, said first member being attached to said base portion of said frame, said second member being attached to said cover, said first member and said second member adhering detachably together, said second member being larger than said first member by an amount and in a direction proportional to the changes in size of said cover with changes in ambient temperature.

9. A truck cap for use with a truck having a cab and a cargo box, said truck cap comprising:
   a plurality of frame members, said frame members being detachably connectable to each other to form a frame, said frame having a top portion and a base portion, said top portion being resilient, said base portion being relatively rigid and detachably connectable to said cargo box, and a flexible cover disposable over said frame, said cover being detachably connectable to said base portion of said frame, said cover being tensioned by said top portion of said frame, to maintain said cover in a predetermined configuration, said plurality of frame members and said cover being juxtaposable when detached from said truck, said frame members and said cover in a juxtaposed position being storable within a space having its longest dimension less than the interior width of said cargo box and its other two dimensions less than the interior height of said cargo box.

10. A truck cap for use with a truck having a cab and a cargo box, said truck cap comprising:
    a plurality of frame members, said frame members being detachably connectable to each other to form a frame, said frame having a top portion and a base portion, said top portion being resilient, said base portion being relatively rigid and detachably connectable to said cargo box, and a flexible cover disposable over said frame, said cover being detachably connectable to said base portion of said frame, said cover being tensioned by said top portion of said frame, to maintain said cover in a predetermined configuration, and a front seal detachably connectable to said cab between said cab and said frame.

11. The truck cap of claim 10 wherein said front seal has a first layer and a second layer and a third layer, said first layer being of a magnetic material, said first layer being disposed adjacent said cab, a second layer being of a resiliently compressible material, said second layer being disposed adjacent said frame, said frame being connected to and between said first layer and said second layer, said second layer being nondeformable to restrict relative movement of said first layer and said second layer.

12. The truck cap of claim 10 wherein said front seal is magnetically connectable to said cab, said front seal having a cab portion, said cab portion being of a magnetic material, said front seal having a middle portion, said middle portion being of a flexible accordian material, said front seal having a resilient retainer, said retainer detachably gripping said frame.

13. A truck cap for use with a truck having a cab and a cargo box, said truck cap comprising:
    a plurality of frame members, said frame members being detachably connectable to each other to form a frame, said frame having a top portion and a base portion, said top portion being resilient, said base portion being relatively rigid and detachably connectable to said cargo box, said top portion of said frame being stressed by outward flexion when said frame members are connected to each other and to said cargo box, and a flexible cover disposable over said frame, said cover being detachably connectable to said base portion of said frame, said cover being tensioned by said top portion of said frame, to maintain said cover in a predetermined configuration, whereby said top portion of said frame opposed a force applied to said cover in an inward direction.

14. A truck cap for use with a truck having a cab and a cargo box, said truck cap comprising:

a plurality of frame members, said frame members being detachably connectable to each other to form a frame, said frame having a top portion and a base portion, said top portion being resilient, said base portion being relatively rigid and detachably connectable to said cargo box, and a flexible cover disposable over said frame, said cover being detachably connectable to said base portion of said frame, said cover being tensioned by said top portion of said frame, to maintain said cover in a predetermined configuration, said base portion of said frame having a front base portion and a rear base portion, said rear base portion having a first section and a second section, said first section being disposed over said tailgate, said first section being connected to said cover, said second section being disposed in front of said tailgate, whereby said tailgate may be operated without disconnection of said cover or said frame.

15. The truck cap of claim 14 further comprising:
a rear seal attached to said second section of said rear base portion, said rear seal being compressible by said tailgate.

16. A truck cap comprising:
a first plurality of frame members, said frame members being repeatedly detachably connectable to each other to form a frame, said frame having a second plurality of stays and a base portion, and a flexible cover disposable over said frame, said cover being detachably connectable to said base portion of said frame, said cover being tensioned by said stays to maintain said cover in a predetermined configuration.

17. The truck cap of claim 16 wherein: said frame is detachably sealable to said truck in a minimal air flow restricting relationship and said cover is detachably sealable to said frame in a minimal air flow restricting relationship.

18. The truck cap of claim 17 further comprising:
a continuous connector having a first member and a second member, said first member being attached to said base portion of said frame, said second member being attached to said cover, said first member and said second member adhering detachably together, said second member being larger than said first member by an amount and in a direction proportional to the changes in size of said cover with changes in ambient temperature.

19. A truck cap for use with a truck having a cab and a cargo box, said truck cap comprising:
a first plurality of frame members, said frame members being detachably connectable to each other to form a frame, said frame having a second plurality of stays and a base portion, said base portion being detachably connectable to said truck, and a flexible cover disposable over said frame, said cover being detachably connectable to said base portion of said frame, said cover being tensioned by said stays to maintain said cover in a predetermined configuration, said plurality of frame members and said cover being juxtaposable when detached from said truck, said frame members and cover in juxtaposed position being storable within a space having its longest dimension less than the interior width of said cargo box and its other two dimensions less than the interior height of said cargo box.

20. A truck cap for use with a truck having a cab and a cargo box, said truck cap comprising:
a first plurality of frame members, said frame members being detachably connectable to each other to form a frame, said frame having a second plurality of stays and a base portion, said base portion being detachably connectable to said truck, and a flexible cover disposable over said frame, said cover being detachably connectable to said base portion of said frame, the cover being tensioned by said stays to maintain said cover in a predetermined configuration, said base portion of said frame having a front base portion and a rear base portion, said rear base portion having a first section and a second section, said first section being disposed over said tailgate, said first section being connectable to said cover, said second section being disposed in front of said tailgate, whereby said tailgate may be operated without disconnection of said cover or said frame.

21. The truck cap of claim 20 further comprising:
a rear seal attached to said second section of said rear base portion, said rear seal being compressible by said tailgate.

22. A truck cap comprising:
a plurality of frame members, said frame members being detachably connectable to each other to form a frame, said frame having a top portion and a base portion, said top portion being resilient, said base portion being relatively rigid, a flexible cover disposable over said frame, said cover being subject to temperature related variations of size, a continuous connector detachably connecting said cover to said base portion of said frame, wherein said cover is tensioned by said top portion of said frame to a predetermined configuration, said continuous connector having a first member and a second member, said first member being attached to said base portion of said frame, said second member being attached to said cover, said first member and said second member detachably adhering together when overlapped, said second member being larger than said first member by an amount and in a direction compensating for said temperature related variations of the size of said cover in the connection of said cover to said frame in said predetermined configuration.

23. The truck cap of claim 22 wherein said frame members are adjustably connectable to each other to adjust the dimensions of said frame and said tensioning of said cover.

24. A truck cap comprising:
a first plurality of frame members, said frame members being detachably connectable to each other to form a frame, said frame having a second plurality of stays and a base portion, a flexible cover, disposable over said frame, said cover being subject to temperature related variations of size, a continuous connector detachably connecting said cover to said base portion of said frame, wherein said cover is tensioned by said stays to a predetermined configuration, said continuous connector having a first member and a second member, said first member being attached to said base portion of said frame, said second member being attached to said cover, said first member and said second member detachably adhering together when overlapped, said second member being larger than said first member by an amount and in a direction compensating for said temperature related variations of the size of said cover in the connection of said cover to said frame in said predetermined configuration.

25. The truck cap of claim 24 wherein said frame members are adjustably connectable to each other to adjust the dimensions of said frame and said tensioning of said cover.

26. The truck cap of claim 10 further comprising:
a pair of side seals attached to said frame between said frame and said cargo box, and a rear seal attached to said frame between said frame and said cargo box.

27. The truck cap of claim 10 wherein said predetermined configuration is streamlined to reduce wind resistance.

28. A truck cap for use with a truck having a cab and a cargo box, said truck cap comprising:
a first plurality of frame members, said frame members being detachably connectable to each other to form a frame, said frame having a second plurality of stays and a base portion, said base portion being detachably connectable to said truck, said stays being stressed by outward flexion when said frame is connected to said cargo box, and a flexible cover disposable over said frame, said cover being detachably connectable to said base portion of said frame, said cover being tensioned by said stays to maintain said cover in a predetermined configuration whereby said stays oppose a force applied to said cover in an inward direction.

29. The truck cap of claim 28 further comprising:
a continuous connector having a first member and a second member, said first member being attached to said base portion of said frame, said second member being attached to said cover, said first member and said second member adhering detachably together, said second member being larger than said first member by an amount and in a direction proportional to the changes in size of said cover with changes in ambient temperature.

30. The truck cap of claim 10 further comprising:
a continuous connector having a first member and a second member, said first member being attached to said base portion of said frame, said second member being attached to said cover, said first member and said second member adhering detachably together, said second member being larger than said first member by an amount and in a direction proportional to the changes in size of said cover with changes in ambient temperature.

* * * * *